United States Patent [19]
Young et al.

[11] Patent Number: 5,705,814
[45] Date of Patent: Jan. 6, 1998

[54] SCANNING PROBE MICROSCOPE HAVING AUTOMATIC PROBE EXCHANGE AND ALIGNMENT

[75] Inventors: James M. Young; Craig B. Prater; David A. Grigg; Charles R. Meyer; William H. Hertzog; John A. Gurley; Virgil B. Elings, all of Santa Barbara, Calif.

[73] Assignee: Digital Instruments, Inc., Santa Barbara, Calif.

[21] Appl. No.: 521,584

[22] Filed: Aug. 30, 1995

[51] Int. Cl.⁶ .................................... H01J 37/00
[52] U.S. Cl. ............... 250/306; 250/307; 250/423 P
[58] Field of Search ............................ 250/306, 307, 250/423 F; 73/105

[56] References Cited

U.S. PATENT DOCUMENTS

| | | | |
|---|---|---|---|
| Re. 34,489 | 12/1993 | Hansma et al. | 25/560 |
| 4,935,634 | 6/1990 | Hansma et al. | 250/560 |
| 4,992,660 | 2/1991 | Kobayashi | 250/307 |
| 5,025,658 | 6/1991 | Elings et al. | 73/105 |
| 5,144,128 | 9/1992 | Hasegawa et al. | 250/306 |
| 5,157,251 | 10/1992 | Albrecht et al. | 250/307 |
| 5,157,256 | 10/1992 | Aaron | 250/304 |
| 5,189,906 | 3/1993 | Elings et al. | 73/105 |
| 5,253,515 | 10/1993 | Toda et al. | 73/105 |
| 5,266,801 | 11/1993 | Elings et al. | 250/306 |
| 5,291,775 | 3/1994 | Gamble et al. | 73/105 |
| 5,307,693 | 5/1994 | Griffith et al. | 73/105 |
| 5,321,977 | 6/1994 | Clabes et al. | 73/105 |
| 5,331,275 | 7/1994 | Ozaki et al. | 324/757 |
| 5,345,815 | 9/1994 | Albrecht et al. | 73/105 |
| 5,345,816 | 9/1994 | Clabes et al. | 73/105 |
| 5,360,977 | 11/1994 | Onuki et al. | 250/306 |
| 5,376,790 | 12/1994 | Linker et al. | 250/307 |
| 5,410,910 | 5/1995 | Somlyro et al. | 250/307 |
| 5,423,514 | 6/1995 | Wakiyama et al. | 250/561 |
| 5,448,399 | 9/1995 | Park et al. | 359/372 |
| 5,496,999 | 3/1996 | Linker et al. | 250/306 |
| 5,569,918 | 10/1996 | Wong | 250/306 |

OTHER PUBLICATIONS

"AutoProbe VP UHV AFM/STM" brochure from Park Scientific Instruments.

"Observer Scanning Probe Microscope for Scanning Electron Microscopes" brochure from TopoMetrix.

"DMEdualScope Scanning Probe and Optical Microscop", brochure from Technical instrument Company, Oct. 18,1994.

"A Complete Family of Scanning Probe Microscopes" brochure from TopoMetrix.

*Primary Examiner*—Bruce Anderson
*Attorney, Agent, or Firm*—Oblon, Spivak, McClelland, Maier & Neustadt, P.C.

[57] ABSTRACT

A scanning probe microscope and method having automated exchange and precise alignment of probes, wherein one or more additional stored probes for installation onto a probe mount are stored in a storage cassette or a wafer, a selected probe is aligned to a detection system, and the aligned probe is then clamped against the probe mount. Clamping is performed using a clamp which is disabled when removing a replacement probe from the storage cassette, enabled when installing the probe on the probe mount and disabled when releasing the probe at a later time for subsequent probe exchange. Probe alignment is automated using signals from the probe detection system or by forming an optical image of the probe using a camera or similar technique and determining probe positioning using pattern recognition processing of the probe image to allow probe removal and exchange without operator intervention. Techniques for error checking are employed to ensure proper probe installation and operation.

75 Claims, 8 Drawing Sheets

SCANNING PROBE MICROSCOPE HAVING AUTOMATIC PROBE EXCHANGE AND ALIGNMENT

BACKGROUND OF THE INVENTION

1. Field of Invention

This invention relates to scanning probe microscopy, and more specifically, to a scanning probe microscope, such as for example, and atomic force microscope, having improved probe exchange and alignment and to a method of probe exchange in a scanning probe microscope.

2. Discussion of Prior Art

1. Scanning Probe Microscopes

Scanning Probe Microscopes (SPMs) scan sharp probes over a sample surface and make local measurements of the properties of a sample surface. One common example is the atomic force microscope, also known as the scanning force microscope, that scans a sharp stylus attached to a flexible spring lever (commonly called a cantilever) over a sample surface. By measuring motion, position or angle of the free end of the cantilever, many properties of a surface may be determined including surface topography, local adhesion, friction, elasticity, the presence of magnetic or electric fields, etc. Other SPMs include the scanning tunneling microscope, the scanning near-field optical microscope, the scanning capacitance microscope, and several others.

2. Probe Replacement

In many of these scanning probe techniques the probes become damaged, contaminated or dull. In this case the probe must be replaced to regain the ability to make high quality measurements of a sample. In the prior art this has been done manually by an operator who removes the old probe and reinstalls a new probe. The probes are often small and delicate and this operation can take significant skill. One example of a delicate probe is the cantilever chip used in atomic force microscopy, shown schematically in FIG. 3. The typical cantilever is 10–500 µm long, 10–50 µm wide and 0.5–5 µm thick, and the cantilever is often fabricated on a support substrate that is roughly 1.5 mm long×3 mm wide×0.5 mm high. Cantilevers are also formed out of single wires or thin metal beams, etc. Because of the delicate nature of the probes and the alignment described below, replacement of the probe in some SPM designs may take many minutes, as described in U.S. Pat. No. 5,376,790, assigned to Park Scientific Instruments. During this time, the SPM instrument is usually unavailable for use, so minimal probe exchange and alignment time is essential for high sample throughput. As scanning probe microscopes become more and more widely used, there is increasing pressure to develop instruments that can be operated more quickly and used by less-skilled operators, or even driven automatically without operator intervention.

3. Alignment of Probe to Detection System

Many probes, including the cantilevers used in atomic force microscopy (AFM), must be precisely aligned with a detection system. In the case of AFM, the detection system measures the motion of the free end of the cantilever probe. Many atomic force microscopes use optical detection techniques that require the cantilever be centered under a focused laser beam that is only perhaps 5–50 microns across. Since the cantilevers have a target area of similar dimensions, cantilever-laser alignment requires precision that often exceeds the ability of users without extremely steady hands. The prior art has dealt with probe alignment in three ways: alignment adjustments, pre-aligned or self-aligning probes, and probes not requiring alignment. Several of these prior art techniques are illustrated in FIG. 1.

4. Mechanical Adjustments for Alignment

As shown in FIG. 1A, the first technique is to incorporate mechanical adjustments that either move the light beam (Hansma et al, U.S. Pat. No. 4,935,634, and Reissue No. 34489, and Albrecht et al U.S. Pat. No. 5,157,251), move the probe (as done on the commercial instrument based on U.S. Pat. Nos. 5,025,658 and 5,189,906), or move the cantilever mount (U.S. Pat. No. 5,144,128). The mechanical adjustments can reduce the users' motions through levers and/or screws to allow the precise motion required for alignment. For example, FIG. 1A shows a simplified cross section view of a mechanism used in the prior art to adjust the light beam 12 on an AFM by mounting a light source 18 on a tilt stage 100. Changing the tilt of the laser changes the position of the emitted light beam. By using a fine pitched screw 102 the light beam can be accurately adjusted to strike the cantilever arm 6 of the probe 4. In the prior art, this adjustment has been done manually.

FIG. 1B shows another prior art technique for aligning a cantilever probe 4. In this case the cantilever probe is mounted on an XY translation stage 24 which is used to align the probe with a detector light beam 12. Such adjustments on the probe are often impractical or undesirable for systems that physically translate the probe because the additional mass required for the adjustment system reduces the resonant frequency of the scanner, and requires slower scanning speeds.

Another prior art device for aligning probes used by with DMEdualScope™ sold by Technical Instrument Company is shown schematically in FIG. 1C. This device consists of an atomic force microscope built into the objective of an optical microscope 104. In this device the cantilever probe 4 is glued to a ferromagnetic holder 106 which is then held magnetically to the end of the objective by a ring- shaped permanent magnet 108. The ferromagnetic holder is placed by hand onto the end of the objective or picked up off a translation stage by the magnet. For final alignment, the user moves a set of pins 110 mounted on the translation stage until they engage holes on the ferromagnetic mount. The user can push the ferromagnetic mount with the pins until the probe is aligned. A similar scheme is described by Wakiyama et al in U.S. Pat. No. 5,423,514.

This procedure has several disadvantages. First, if the ferromagnetic probe mount 106 is not installed by hand, but instead lifted off the XY translation stage 24 magnetically, the permanent magnet on the objective will cause the ferromagnetic probe mount and probe to jump into contact with the magnet 106 over a distance of few millimeters. The jump into contact is a chaotic and potentially harmful step. The resulting impact between the ferromagnetic probe mount 106 and the magnet 108 generates particles that can be a serious contamination problem when used for critical samples. Scanning probe microscopes are being increasingly used to monitor steps in semiconductor and integrated circuit fabrication facilities, where such particle contamination is unacceptable.

In addition, the jump into contact is a somewhat irreproducible event—the ending position of the cantilever probe will be randomly offset by much more than the alignment tolerance required by the detection system. To correct for the random offset caused by the jump, additional alignment of the probe is required using the special pin fixture 110. Also, the surfaces of the magnet 108 and ferromagnetic probe mount 106 are not precision sliding surfaces, so the final alignment of the probe can be awkward, requiring extensive intervention by an operator during probe exchange.

5. Pre-Aligned Probes and Self-Aligning Probes

Several techniques exist for "pre-aligning" probes or building self-aligning probes. For example, cantilever probes have been mounted on a special indexed holders 112, also described by Hansma in the above mentioned patents and additionally in U.S. Pat. No. 5,376,790. Pre-aligned cantilever probes have been sold commercially by TopoMetrix and Park Scientific Instruments and are described further in their sales literature. The indexed holders typically have a kinematic mounting arrangement 114 that ensures that they will be precisely positioned with respect to the atomic force microscope detection system. Cantilever probes 4 are then placed (usually at the factory of an AFM manufacturer) on the indexed holders 112, aligned to some standard and then glued into place. If the standard can be maintained at the factory and the each of the AFMs that match the standard maintain sufficient alignment to the original standard, each cantilever installed into the AFM will be "pre-aligned" with the detection system. The additional components and labor required for pre-aligning cantilevers substantially drives up the cost of the probes to the customer. Also, some of these systems have proven unreliable in practice, requiring manual adjustment by the operator in the field.

The support substrates 8 of cantilever probes 4 have also been built with kinematic or semi-kinematic mounting surfaces etched into the bottom surface, as shown in FIG. 1E. Such cantilever probes have been built by Nanoprobe of Germany and described by Toda et al. in U.S. Pat. No. 5,253,515. A mating surface 116 can then be installed in the AFM so that the cantilever will align itself to the detection system 12.14 upon installation. Unfortunately, due to the small dimensions of the cantilever support substrate, the alignment features on the mating surface are extremely delicate and susceptible to damage. Misalignment can also result if small particles contaminate the cantilever support substrate or the mating surface. Since there is also no standard alignment system at present, building a specific cantilever mating surface into an AFM makes it incompatible with a large variety of other cantilever probes.

6. Non-aligned Probes

Finally, several types of probes have been used that do not require fine alignment to a detection system. The electrode tip of the Scanning Tunneling Microscope (STM) is an example (FIG. 1F). For STM, a sharp metal needle is inserted into a conducting holder which makes electrical contact to an amplifier which measures the tunneling current between the tip and sample. No fine alignment is required— only contact with a conducting mount and electrical connection to the amplifier. Often such tips are held in a small section of syringe tubing 120. For such a system, tip exchange is very simple and can be easily performed by hand with a pair of tweezers. Several other scanning probe microscopes use probes where alignment may not be necessary—including the electrode probe of the Scanning Ion-Conductance Microscope and in some cases the Scanning Near-Field Optical Microscope (SNOM).

Other non-aligned probes have also been developed for atomic force microscopy (AFM), including strain gauge cantilever probes 122 (FIG. 1G) containing piezoelectric or piezoresistive material 124 which produces a change in voltage or resistance in response to cantilever bending. Such probes were first disclosed in U.S. Pat. Nos. and 5,229,606 and 5,266,801 and have since also described in U.S. Pat. Nos. 5,345,816, 5,345,815 and 5,321,977. Non-aligned STM probes and piezoresistive cantilever probes are used in the AutoProbe™ VP UHV AFM/STM sold by Park Scientific Instruments.

While these non-aligned piezoelectric and piezoresistive probes are convenient for working in inaccessible environments like UHV, they have yet not matched the sensitivity level of the best optical detection systems for AFM. Also the sensitivity of piezoresistive and piezoelectric cantilever probes are tied to the cantilever's mechanical properties—a cantilever with very high deflection sensitivity may be too stiff for many applications. For these reasons the vast majority of commercial AFM systems still use optical detection techniques which require alignment of the cantilever probe to the detection system.

7. Prior Art Probe Exchange

Most of the prior art scanning probe microscopes have no provision for automatic probe exchange. These systems require that an old probe be removed by hand and a new probe installed by hand in its place. A few systems have multiple probes mounted on carousels or similar rotatable carriers. For example, AutoProbe™ VP UHV AFM/STM sold by Park Scientific Instruments and the device described by Aaron in U.S. Pat. No. 5,157,256 for an STM operating in Ultra-High Vacuum (UHV) have means for holding multiple non-aligned STM probes on a carousel and rotating new probes into place. Toda et al. (U.S. Pat. No. 5,253,515) describe a similar mechanism for mounting pre-aligned or self-aligning AFM cantilever probes on a rotatable carrier. The technique described above for use with the DMEdual-Scope could also be adapted for use with multiple probes, but the irreproducibility of the probe position after the ferromagnetic probe mount jumps into contact with the magnet, and the associated particle contamination problems make this technique unsatisfactory for automated systems measuring critical samples.

In summary, the prior art has not provided a reliable method of probe exchange and alignment that can be incorporated into scanning probe microscopes for a variety of probe types without substantial increase in cost, complexity or reliability. In addition, the prior art does not provide for automatic probe exchange and alignment without operator intervention.

SUMMARY OF THE INVENTION

Accordingly, one object of this invention is to provide a new and improved scanning probe microscope and method of operating a scanning probe microscope, including convenient and reliable probe exchange and alignment.

Another object of this invention is to provide a new and improved scanning probe microscope and method of operating a scanning probe microscope, which can easily accommodate exchange and alignment of a variety of probe types without substantial cost or complexity.

Yet another object is to provide a new microscope and method as above noted, wherein probe exchange and alignment is automated.

These and other objects are achieved according to the present invention by providing a novel scanning probe microscope, including probe storage means for storing at least one probe; a probe mount for supporting the probe stored by the probe storage means when the probe is transferred to the probe mount; a detection system which detects a probe response related to the at least one property of the sample; translation means for producing relative translation between the probe mount and the sample and between the probe storage means and the detection system;

selectively activatable probe pickup means for removing a probe from the probe storage means and installing the probe on the probe mount; and control means for controlling the translation means to position the probe storage means in relation to the detection system and then activate the selectively activatable probe pickup means.

In a preferred embodiment of the scanning probe microscope of the invention, the probe pickup means includes alignment detection means for measuring the relative alignment of a probe stored in the probe storage means with the detector system, and the control means includes means for receiving input from the alignment detection means and outputting control signals applied to the translation means to generate relative motion between the stored probe and the detector system until desired alignment between the stored probe and detection system is achieved, and means for then activating the selectively activatable probe pickup means.

In one embodiment, the translation means includes first means for producing relative translation between the probe storage means and the detection system, and second means for producing relative translation between the probe mount and the sample. A combination of motions produced by the first and second means can be used to produce alignment between the stored probe and the probe mount.

According to the present invention, the control means determines when the stored probe and the probe mount are in close proximity or contact prior to alignment of said stored probe so that said stored probe is aligned while in close proximity or in contact with said probe mount. The stored probe is clamped to the probe mount when the desired alignment of the stored probe is achieved. Clamping is implemented by means of a vacuum clamp, a mechanical clamp, an electrostatic clamp or an electromagnetic clamp, or other similar clamping means.

In a preferred embodiment, the method of the present invention includes arranging the stored probe in close proximity or contact with the probe mount before clamping the probe to the probe mount. Various error-checking methods are used to determine whether the probe is securely mounted.

In a preferred embodiment of the scanning probe microscope of the present invention the probe storage means is implemented as a probe storage cassette or as a wafer on which plural probes are held. The probe storage means is mounted on the translation means also used to move the sample with respect to the probe.

The present invention is also directed to a new and improved method of mounting a probe on a probe mount of a scanning probe microscope which is capable of producing a map of a property of a sample, the microscope including means for producing relative translation between the probe mount and the sample, and a detection system for detecting a response of the probe related to the property of the sample. The method includes storing on a probe storage device a probe for mounting on said probe mount; aligning the stored probe to the detection system; and attaching the stored probe to the probe mount when the probe is aligned.

In one aligning technique, a position sensitive detector is used to produce at least one of a sum signal, a vertical deflection signal and a lateral deflection signal indicative of alignment. In another technique, alignment is achieved by producing an optical image of the probe and recognizing a pattern of the produced image. In another technique, the method includes providing fiducial marks on the probe storage device, forming an image including the fiducial marks, detecting the fiducial marks in the image, and aligning the stored probe based on the detected fiducial marks.

After alignment, the method of the invention includes clamping the aligned stored probe to the probe mount typically by applying a vacuum to the aligned stored probe to hold the aligned probe against the probe mount by means of the vacuum. Various error-checking procedures are used to determine whether the probe is securely mounted. More generally, the probe is clamped to the probe mount using a vacuum clamp, a mechanical clamp, an electrostatic clamp, or other similar clamp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
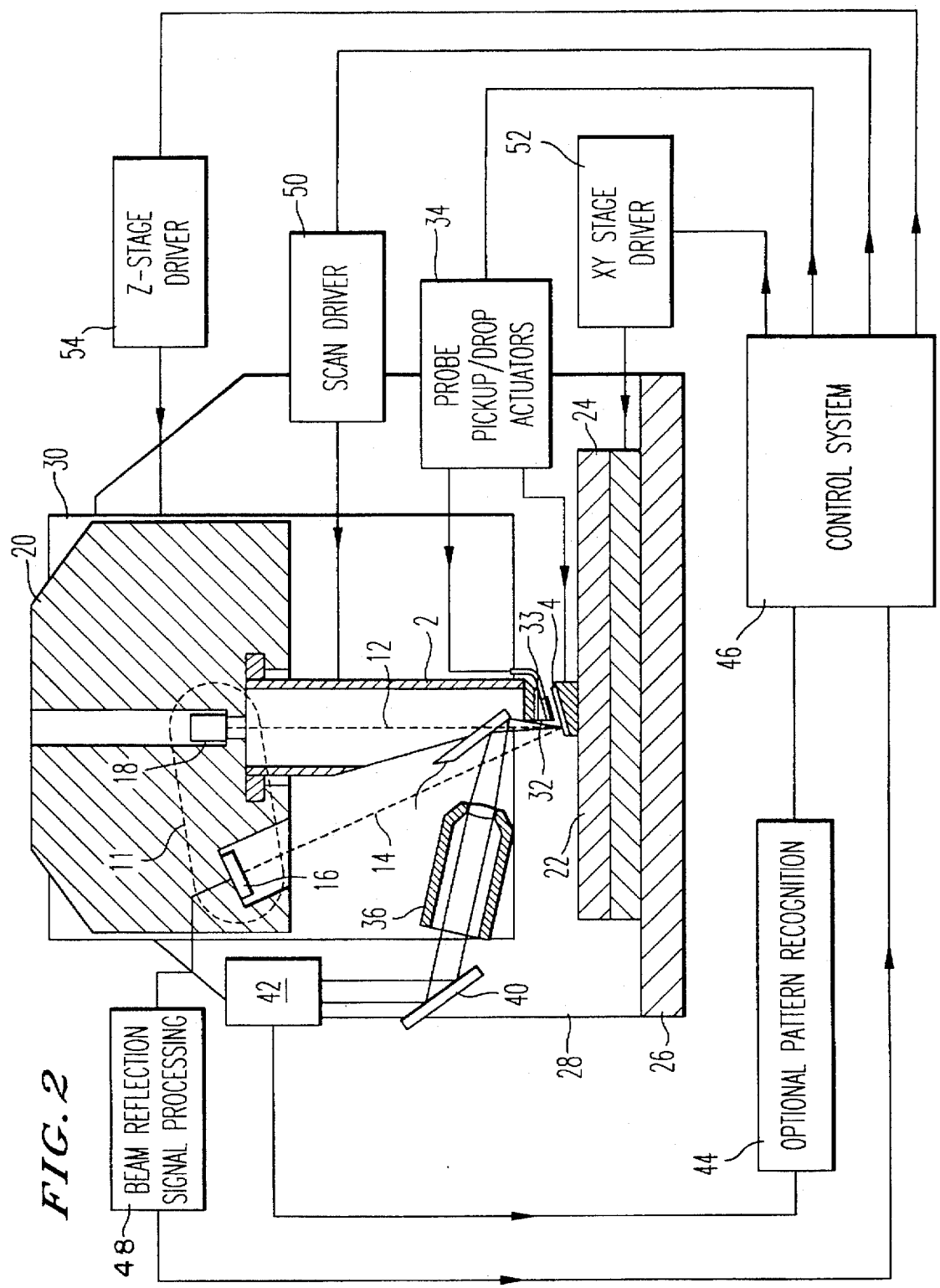
FIG. 2 is a simplified schematic cross-sectional view of a scanning probe microscope equipped with automatic probe exchange and alignment capability according to the present invention.

Referring now to the drawings, wherein like reference numerals designated identical or corresponding parts throughout the several views, and more particularly to FIG. 2 thereof, an example of a scanning probe microscope equipped with automatic probe exchange and alignment capability according to the present invention is illustrated.

For illustration purposes only, a specific design of an atomic force microscope (AFM) is shown, although the general principles illustrated are applicable to a variety of scanning probe microscopes.

1. Basic scanning probe microscope design and operation including a specific Atomic Force Microscope design In scanning probe microscopy, a scanning mechanism (scanner, for short) 2 generates relative motion between a probe 4 a sample (not shown).

Probe 4 is capable of generating a signal or response related to one or more properties of the sample. A detection system 11 measures or a magnifies or amplifies the signal or response generated by the probe. The scanner, probe, detection system, associated electronics and data acquisition system are used to produce a map of one or more sample properties at one or more points on the sample. The scanner can have any number of translation axes, but usually has the ability to scan in three axes, two parallel to the sample surface (X- and Y-axes) and one vertical to the sample (Z-axis). The scanner is often made of piezoelectric material, in the shape of a single tube capable of scanning in three axes, or made of combinations of multiple single-axis elements, or any combination of tubes and single axis elements. The motion of the scanner may also be constrained or amplified with various mechanical means. Scanners can also be constructed from electrostrictive, magnetostrictive or any similar material, and in fact can be made of any device or devices that produce sufficiently fine motion.

Figure 3:
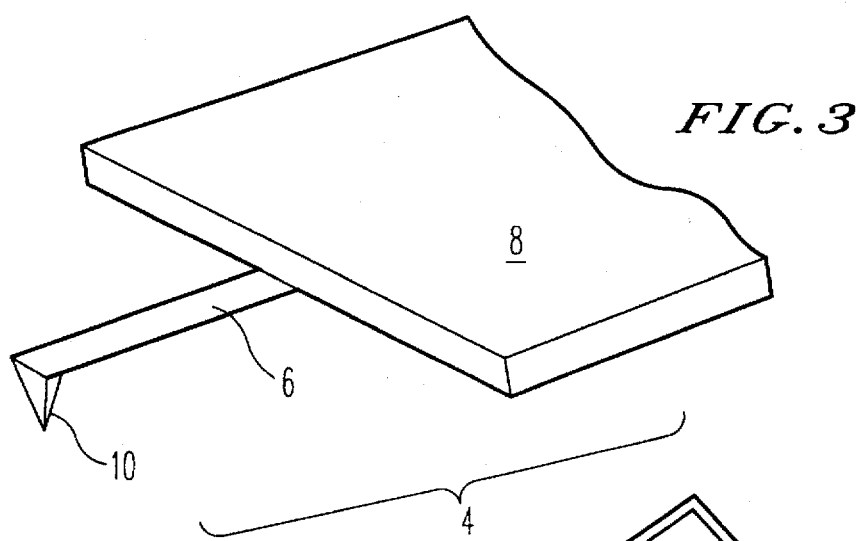
FIG. 3 is a simplified perspective view of a cantilever probe used in atomic force microscopy.

In the case of atomic force microscopy, the probe 4 is usually a spring lever or cantilever 6 mounted on support substrate 8 (see FIG. 3). The cantilever 6, its stylus 10 and its support substrate together are referred to as the probe 4. In force microscopy the detection system 11 detects motion of the free end of the cantilever. Various optical techniques are often employed to detect this motion. An example of the detection system 11 employing optical lever detection is shown in FIG. 2. In this case a light beam 12 is focused onto the cantilever and the reflected beam 14 is directed at a position sensitive detector 16. The position sensitive detector is usually a two- or four-segment photodiode or a lateral effect photodiode. As the free end of the cantilever 6 deflects in response to surface features, the reflected light beam 14 changes its position on the position sensitive detector 16. Together the light source 18, the light beams 12 and 14, the position sensitive detector (PSD) 16 form the detection system 11, in the case of optical lever AFMs. The scanner 2, light beam source 18 and PSD 16 are shown here mounted to a common assembly, usually referred to as an AFM head 20. Of course, many varying arrangements of scanners, beam sources, probes and detectors have been and can be built.

AFMs also have been built in which the detector 11 includes an optical interferometer, and other detection systems have even been built employing electron beams instead of light beams. In early AFMs a scanning tunneling microscope tip was placed above the AFM cantilever and variations in electron tunneling was used to detect cantilever deflection. In all of these techniques the detection system must be aligned to the probe 4, usually with a precision on the micron scale. The high alignment precision required makes it a challenge to install and align new probes.

Figure 4A:
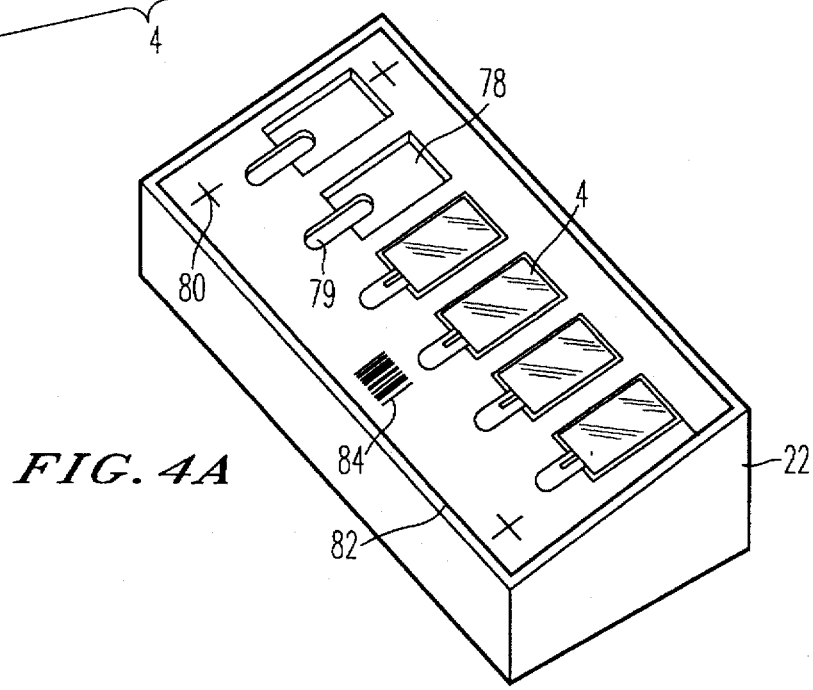
FIGS. 4 and 4B are simplified perspective views of respective embodiments of a probe cassette for holding multiple probes in storage for use in a scanning probe microscope according to the present invention.
Figure 4B:
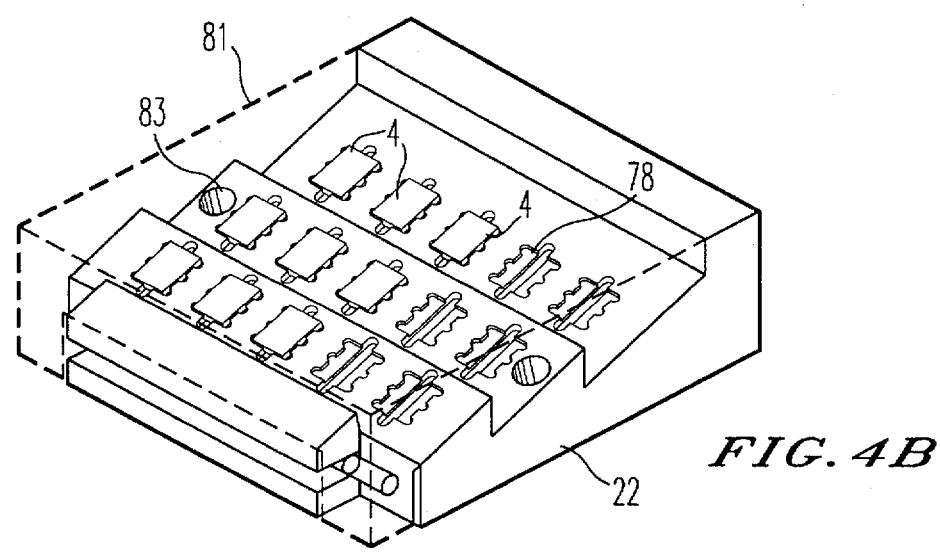

2. Probe Exchange and Alignment—Probe cassette, probe mount and translation stages FIG. 2 also shows probe exchange and alignment elements, including a probe cassette, probe mount and translation stages which are used for automatic probe exchange and alignment. As shown schematically, probes 4 are mounted on a probe storage device, here a probe storage cassette 22, which can store one or more probes for installation in the scanning probe microscope. Possible probe cassette are shown in FIGS. 4A and 4B. The probe cassette 22 is mounted on an XY translator 24 or similar device for producing motion of the probe cassette 22 and stored probes 4 relative to the SPM detection system 11. Such XY translators are already commonly used in scanning probe microscopes to move the sample relative to the SPM or move the SPM relative to the sample. These XY translation stages are usually precision devices that can generate motion reproducible on the micron-scale, and such devices are already in use in the Dimension™ series SPM systems manufactured by Digital Instruments.

The XY translator 24 in this case is mounted to a support platform 26. A vertical support frame 28 is mounted to the support platform 26 to which a Z translator 30 is mounted. The Z-translator 30 or similar device creates relative vertical motion between the SPM head 20 and the probe cassette 22. In alternate arrangements, the Z-translator could move the probe cassette instead—any permutation of translators which provides X-,Y- and Z-axis travel of the SPM head with respect to the probe cassette can be used according to the present invention.

Probe mount 32 is attached to the free end of scanner 2. The probe mount has some selectively activatable pickup mechanism, two embodiments of which are detailed in FIGS. 5 and 6, for picking up and holding probes 4 stored on the probe cassette 22. For oscillating probe systems, another oscillation driver 33 (usually a small piezoelectric device) may be mounted near the probe mount 32. Oscillation of the probe may also be induced by adding vertical modulation signals to the Z-axis of the scanner 2.

The rest of the system shown in FIG. 2 is involved in controlling the process of aligning and picking up a probe 3 from the probe cassette 22. The general procedure of this device and technique is to move the probe cassette 22 or probe mount using any or all of the XY translator 24, the Z translator 30 and the scanner 2. When the probe 4 is appropriately aligned to the detection system 11, a probe pickup actuator 34 is enabled to lift the probe off the probe cassette 22 onto the SPM's probe mount 32. At this point the probe 4 is attached to the scanner 2 and ready to measure properties of the sample.

3. Detecting proper probe alignment

A. Optical pattern recognition

An alignment detection system can be used to detect if the probe is properly aligned before the pickup actuator 34 is enabled. Two such alignment detection systems are illustrated in FIG. 2. In one technique, an objective lens 36 is arranged so that it can view the position of the probe 4. In the embodiment shown, an image of the probe 4 is formed inside camera 42, mounted to the vertical support frame, using the objective lens 36, a partial mirror 38 and a mirror 40, all mounted to the Z-translator. The details of this optical system are provided for illustration only-many alternative systems that provide a view of the probe would also work.

In the embodiment shown in FIG. 2, the image from the camera 42 is sent to an optical pattern recognition system 44. The optical pattern recognition system is designed or programmed to look for the shape of the probe 4 and to produce signals that indicate to what degree the end of the probe is offset from some reference position. This is typically done by forming a cross-correlation map of the some subset of camera image and a reference shape. Of course the pattern recognition system can be constructed as simply as projecting an image of the probe onto a 4-segment photodiode or other position sensitive detector. For a simple object like a beam-shaped cantilever, the signals from a 4-segment photodetector can easily be processed to indicate which direction the probe is offset from a reference position.

Figure 7:
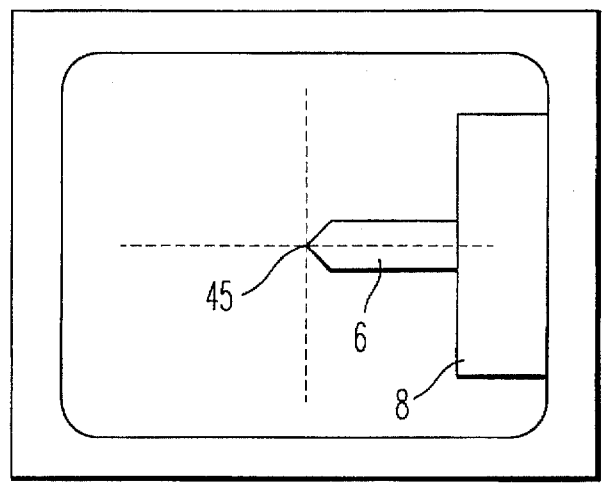
FIG. 7 is a plan view illustrating aligning a cantilever probe in a scanning probe microscope using optical viewing, including the possible use of video imaging or pattern recognition according to the present invention.

The signals from a pattern recognition system or similar device are sent to a control system 46 which then issues commands to a set of motion drivers 50, 52, 54 which control the motion of the XY translator 24, Z translator 30, and scanner 2, respectively. Any or all of the translators and/or scanner are used to move the probe until it is aligned to some reference center point 45. The reference center point is chosen through a calibration process so that when the probe is aligned with the reference it is also aligned to the detector system 11. The final alignment of an AFM cantilever probe is shown schematically in FIG. 7. Alternatively, in a non- automated system, a user could manually generate the required XYZ motion of the probe before the probe pickup actuator is enabled by observing the image of the probe.

B. Reflection Signal

As an alternative to the pattern recognition technique described above, the detection system 11 itself may be used as the alignment detection system to align the probe for pickup. This is also shown schematically in FIG. 2. This is an appealing technique because it requires fewer additional components and can be included in even lower cost scanning probe microscope systems.

In the specific case shown of optical lever deflection for the AFM, the output of the position sensitive detector 16 is sent to signal processing electronics 48. The signal processing electronics may produce a variety of signals, however, three simple signals are especially useful: (1) sum signal; (2) vertical deflection; and (3) lateral deflection. The sum signal is a measure of the total amount of light reflected in reflected beam 14 from the cantilever probe 4. The vertical and lateral deflection signals measure the relative vertical and lateral angle of free end of the cantilever with respect to the detection system, specifically the incoming light beam 12.

To achieve alignment of the probe 4 in the probe cassette 22, any or all of the XY translator 24, Z translator 30 and scanner 2 are moved until a satisfactory reflected beam 14 is detected by the beam reflection signal processing electronics 48. One way this may be done simply is to monitor the "sum" signal described above while raster scanning the probe with respect to the SPM detection system or vice versa. This is shown schematically in FIGS. 8A and 8B. In these figures, an AFM cantilever is scanned in the directions perpendicular (FIG. 8A) and parallel (FIG. 8B) to the cantilever axis. Note that these scans can be generated with the XY translator 24 or scanner 2, a combination, or any equivalent translation means, depending on the scan range, speed, accuracy and stability required. For instance, the XY translator could be used for coarse alignment and the scanner motion used for fine alignment.

Figure 8A:
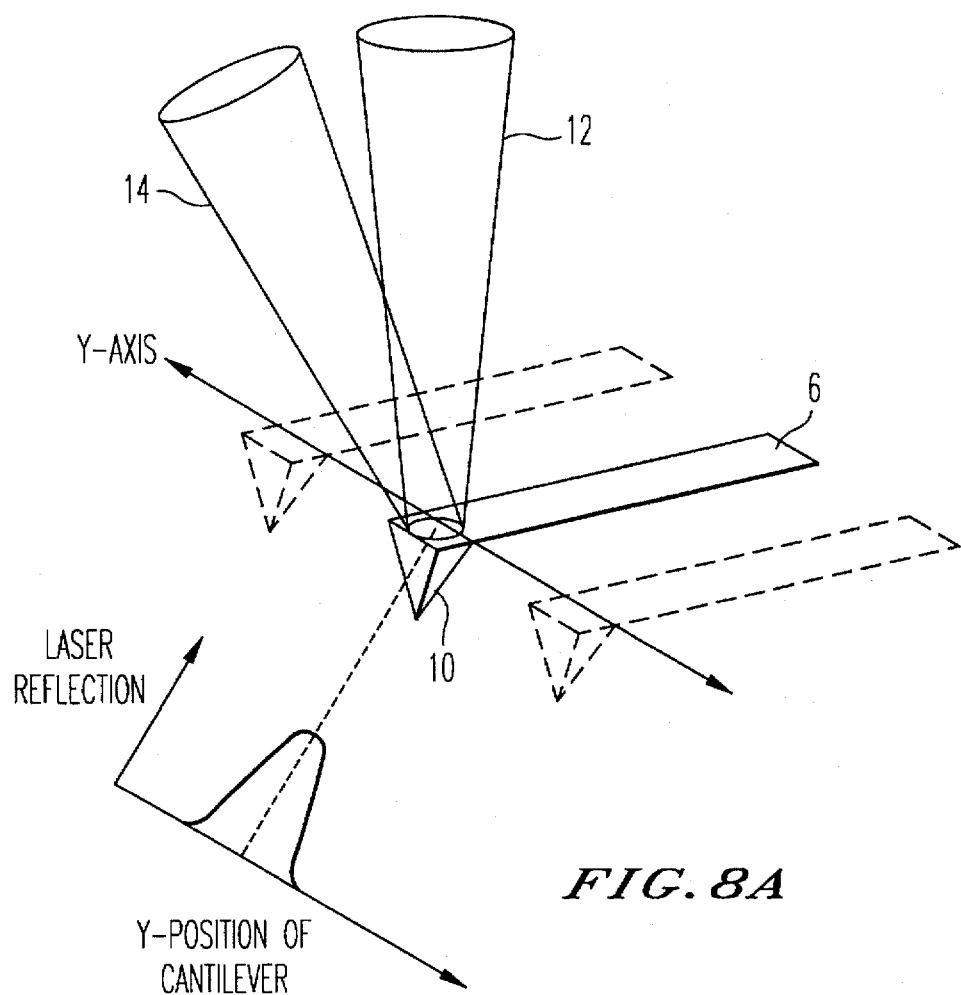
FIG. 8A is a schematic sketch of a process for aligning a cantilever probe with respect to a detection beam in the direction perpendicular to the cantilever length according to the present invention.
Figure 8B:
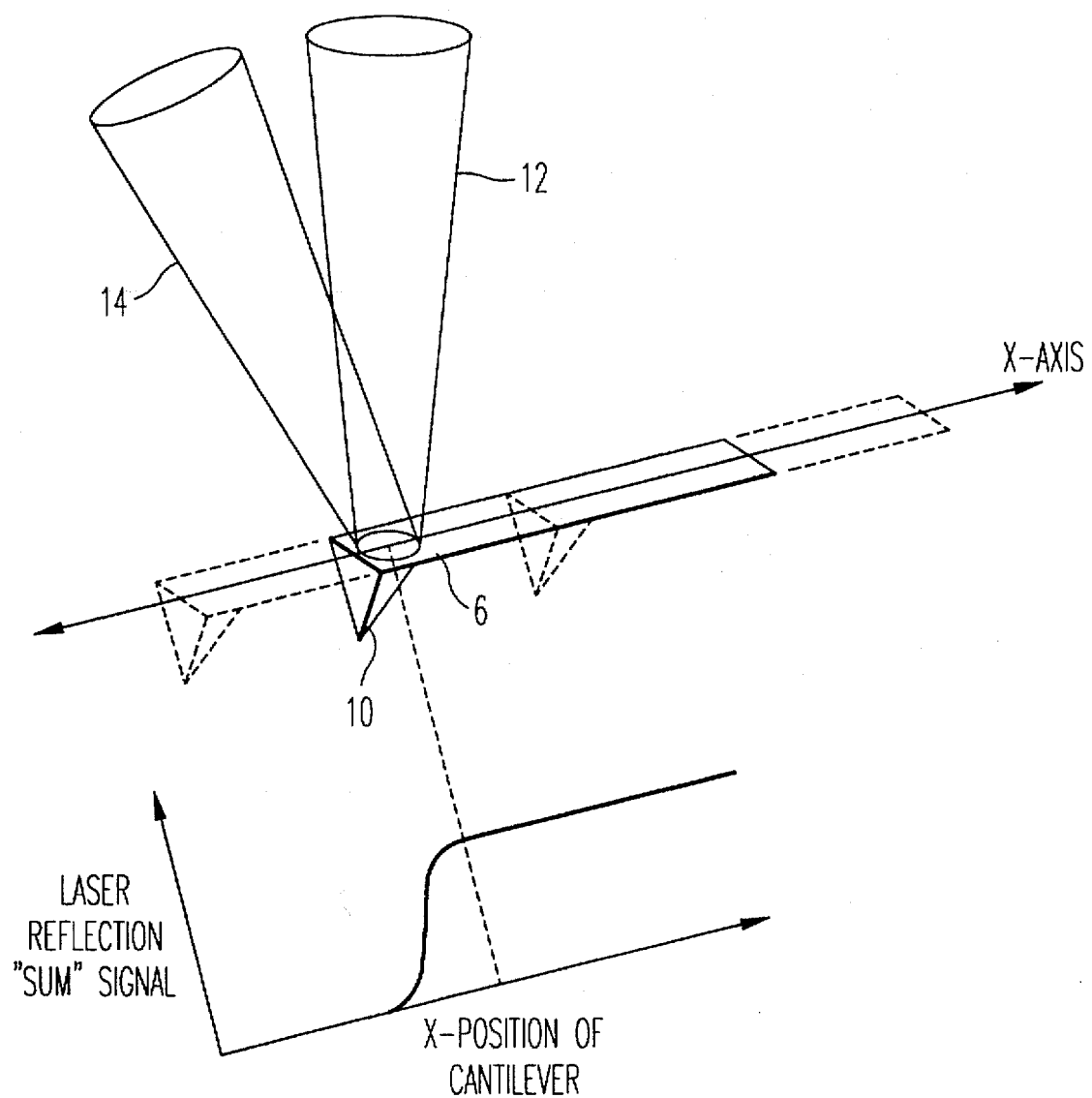
FIG. 8B is a schematic sketch of a process for aligning a cantilever probe with respect to a detection beam in the direction along the cantilever length according to the present invention.

The laser reflection "sum" signal is plotted versus the motion in both cases. In FIG. 8A the laser "sum" signal shows a maximum when the center of the incoming light beam is aligned with the center of the cantilever probe. The laser sum signal can be used by the control system 46 to execute commands to move either or both the XY translator 24 or scanner 2 until the probe 4 is centered on the detection system in the Y-axis, perpendicular to the cantilever axis.

Once the cantilever is centered in the Y-axis, a similar scan may be executed in the X-axis, along the cantilever length. The "sum" grows from essentially zero to a maximum value when the cantilever moves from outside the path of incoming light beam 12 directly into the beam's path. The optical lever and similar techniques are most sensitive when the incoming beam 12 is located close to the free end of the AFM cantilever probe. Because the laser reflection sum signal will remain at a maximum value even as the incoming light beam is moved toward the fixed end of the cantilever (where the detection system is less sensitive), additional means must be used to choose the position of the cantilever. By a calibration procedure, for example, the position of the incoming beam that produces the best sensitivity can be found. For example, in one embodiment a predetermined offset distance from the point where the sum signal is maximum, such as the 50% point, is programmed or set in the control system. The control system issues commands to either or both the XY translator 24 or scanner 2 until the desired offset position is reached. Of course, many similar schemes may be used, including looking for a maximum in the x-axis derivative of the sum signal or moving the cantilever until perhaps 95% of the maximum sum signal is found. The particular process that works best depend on the details of the cantilever and incoming beam shapes, and can be optimized for specific cases.

It is worth noting that during this procedure, additional alignment of the SPM may be accomplished automatically. For example, the optical lever AFM usually requires that the reflected light beam 14 is roughly centered on the position sensitive detector 16. During or after the alignment and pickup of the cantilever probe, vertical and lateral deflection signals created by the beam reflection signal processing electronics 48 and control system 46 can be used to generate motion control signals that move and center the position sensitive detector 16 with respect to the reflected light beam 14. Alternatively, the control system 46 can generate signals to electronically offset the vertical and lateral deflection signals so that these signals are in the center of their available range.

C. Alternative alignment techniques

Figure 1A:
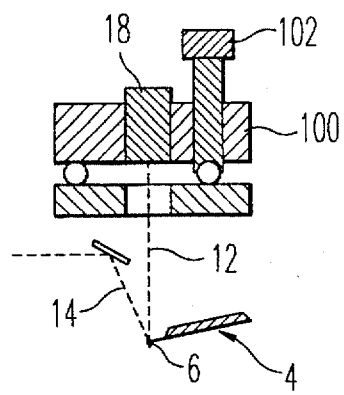
FIGS. 1A–1E are simplified illustrations of several prior art systems used for aligning probes in a scanning probe microscope to a detection system and FIGS. 1F & G are simplified illustrations of prior art SPM probes that do not require such alignment.
Figure 1B:
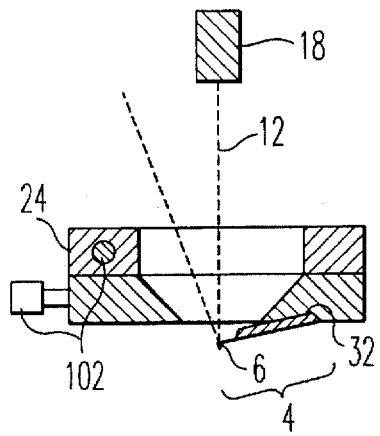
Figure 1C:
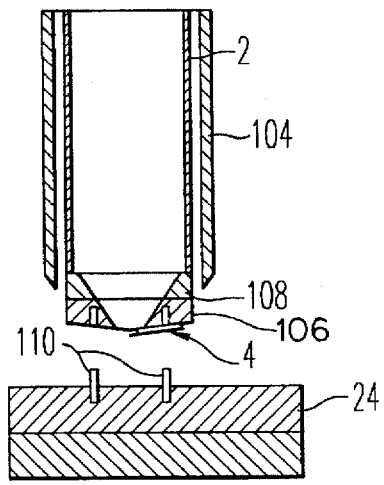
Figure 1D:
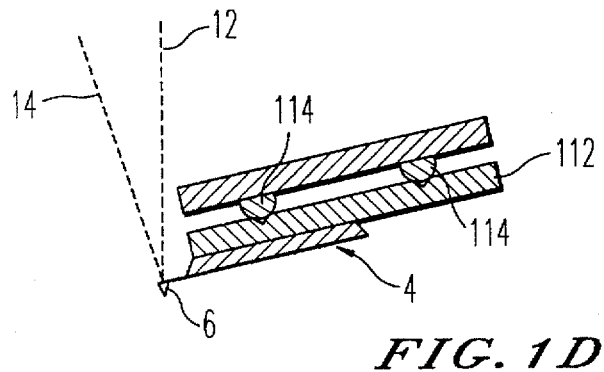
Figures 1E, 1F:
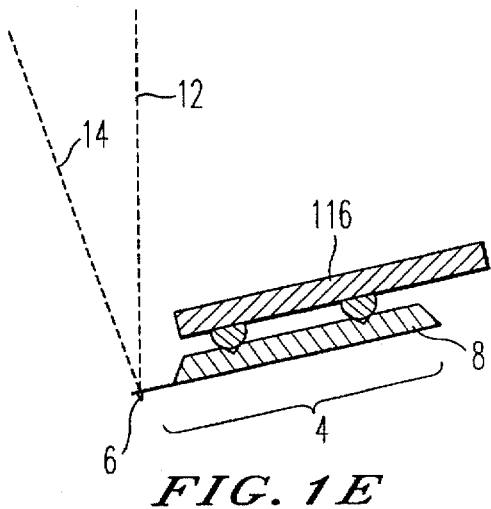
Figure 1G:
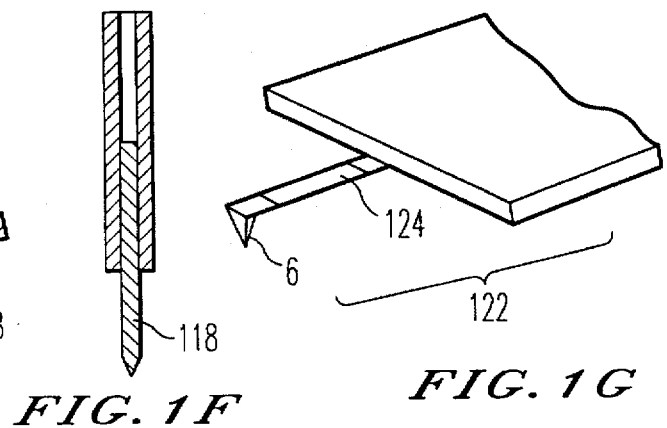

Of course any combination of the above procedures can be used. For example, optical pattern recognition can be used for coarse alignment and the laser reflection signals used for fine alignment. Alternatively, fine alignment can be performed with additional motors or drive mechanisms. For example, in the prior art system shown in FIG. 1A, motors can be attached to the screws that adjust the light beam position. The control system and similar motion drivers can adjust the light beam position using any of the techniques described above to align the light beam with the probe. In addition, a variety of other alignment detection techniques can be used including proximity sensing of the probe's position by capacitive, magnetic, optical or mechanical means.

D. Position sensitive detector alignment

For maximum dynamic range of the detection system, it is often necessary to center the detector with respect to the measuring beam. For example, in the case of optical lever AFMs, it is usually necessary to center the reflected beam 14 on the position sensitive detector 16, or electronically compensate for any offsets. For consistent cantilevers or similar probes, no adjustment may be required. In the case of some probes that tend to warp or bend to varied degree, mechanical translation or electronic offset of the position sensitive detector may be required. Motors or electronic offsetting schemes may also be included as part of automated probe exchange and alignment.

4. Determining multiple probe positions before pickup

Any of the techniques described above for detecting probe alignment can be used to determine the position of an array of probes 4 held in storage on a probe cassette 22. To construct a log of the positions of probes held in storage any of alignment techniques can be repeated for multiple probes, minus the step of picking up the individual probes. Probes can then be exchanged quickly by moving the XY translator 24 and/or scanner 2 to the recorded position of a selected probe.

5. Details of Probe Pickup Mechanisms

Figure 5:
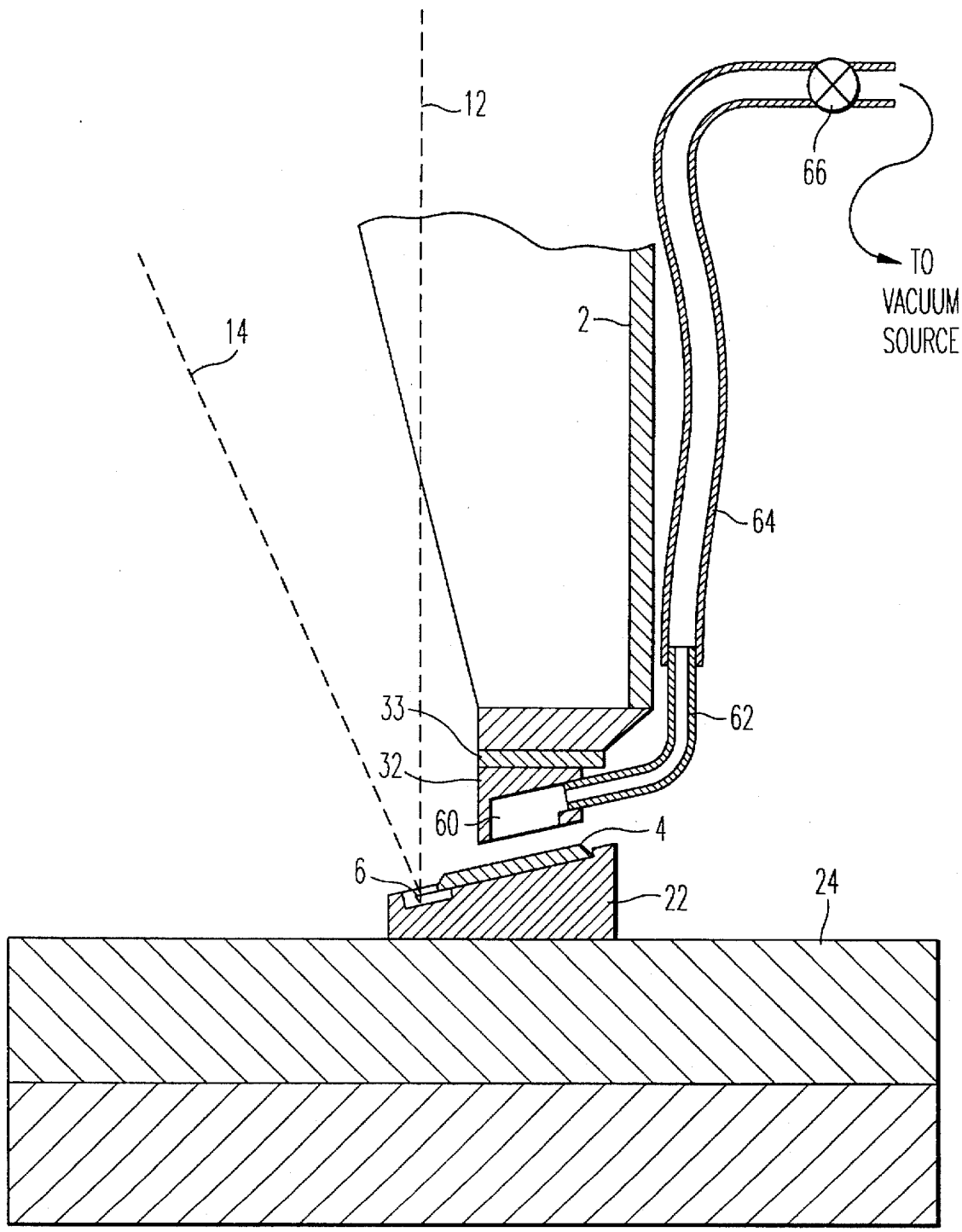
FIG. 5 is a simplified schematic cross-sectional close-up view of a scanning probe microscope using vacuum to pick up and hold probes in a scanning probe microscope according to the present invention.
Figure 6:
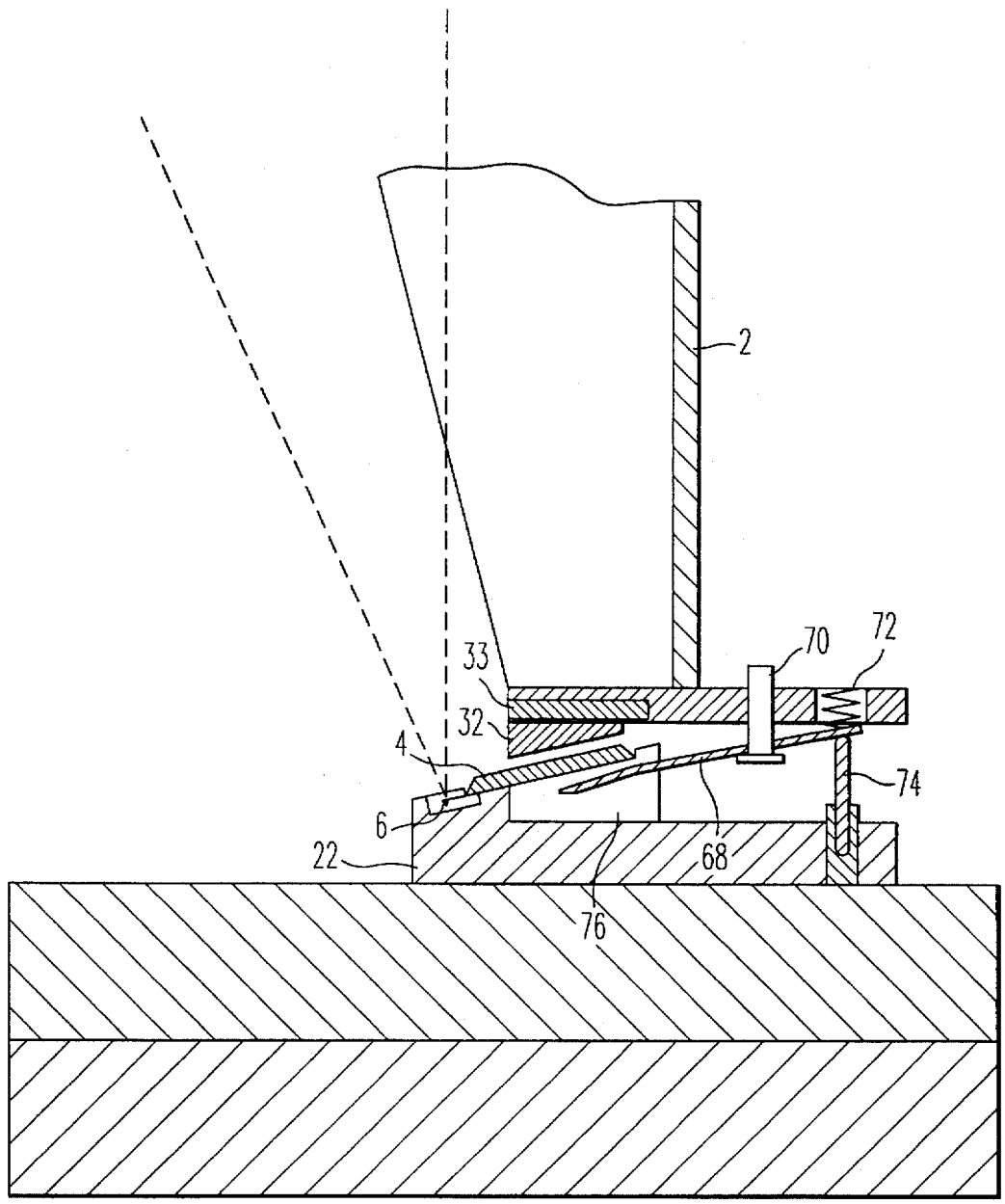
FIG. 6 is a simplified schematic cross-sectional close-up view of a scanning probe microscope using a mechanical clamp, spring assembly, and a linear actuator to pick up and hold probes in a scanning probe microscope according to the present invention.

Once the cantilever is aligned in the X- and Y-axes relative to the detection system using one of the techniques described above or any suitable alternative, the Z translator 30 is moved until the probe is within the vertical range of the probe mount pickup mechanism 32. This step can also be performed earlier if probe alignment can be done with the probe already within the vertical range of the probe mount pickup mechanism. Two types of probe mounts are shown in FIGS. 5 and 6. Note that neither mounting system described below requires a special contoured mating surface on the probe. For this reason, these and similar probe mounting techniques can be used for a much larger variety of probe shapes than a system designed for a specific self-aligning probe.

A. Vacuum probe mount

FIG. 5 shows a simplified cross-sectional view of the end of a scanner 2 onto which is mounted a vacuum-based probe mount 32. In the design shown, the probe mount 30 is manufactured with a hollow vacuum cavity 60. One opening of the vacuum cavity is directed downwards towards the probe 4. A vacuum fitting 62, made for example out of syringe tubing, is attached to the other opening of the vacuum cavity 60 in the probe mount 32. A flexible tube 64 is attached to the vacuum fitting 62. The other end of the tube 64 is connected by way of any necessary additional plumbing to a valve 66 and then to a vacuum source (not shown). The vacuum valve 66 is a form of probe pickup actuator 34 in FIG. 2. The flexible tube 64 is chosen to be light and flexible so that it does not restrict the motion of scanner 2 or transmit unwanted vibrations. Once the Z-translator 30 moves the probe 4 into range of the vacuum probe mount 32, the probe pickup vacuum valve is opened and the probe is pulled up against the lower opening of vacuum cavity 60.

B. Mechanical probe clamp

An alternative embodiment for the probe pickup mechanism is shown in FIG. 6. In this design, a mechanical probe clamp 68 is used to clamp the probe 4 against the probe mount 32. Many different mechanical clamping schemes could be used. In the design shown, the mechanical clamp rocks on a pivot screw 70 and is spring-loaded by a compression-type clamp spring 72. When the probe mount 32 is far from the probe cassette 22, the clamp spring 72 extends and pushes on one end of the probe clamp 68 causing the other end to push the probe 4 against the probe mount 32. The probe cassette 22 has in this case a cutout 76 that allows the probe clamp 68 to move under a portion of the probe 4 so that the clamp can lift the probe off the probe mount. To release the probe clamp 68, a solenoid-driven plunger 74 or similar device can be used to push against the end of the probe clamp. Once the bottom of the probe mount 32 is located sufficiently close to the top of the probe 4, the solenoid plunger 74 is disengaged, clamping the probe against the probe mount, ready to be used to measure properties of a sample. This type clamping system could also be used for automatic probe exchange in a vacuum system where it is difficult to change the probe manually.

C. Alternative probe mounting methods

Many alternative methods can and have been used for mounting the probe against a probe mount. Examples include different mechanical clamps, electromagnetic or electrostatic mounting, the use of weak adhesives, etc. The only requirement for the probe mounting method is that it can reproducible be enabled and disabled to pick up and release a probe.

D. Pre-aligned, self-aligning, and non-aligned probes

Also note that in an alternative embodiment using pre-aligned, self-aligning, or non-aligned probes, the probe may be picked up using any of the described methods, without any of the fine alignment steps described. In this case the XYZ translation stages would simply move the probe within range of the probe pickup mechanism and the probe pickup actuator would be engaged. Pre-aligned, self-aligning or non-aligned probes do not require the separate step of aligning the probe to the detection system.

6. Vertical positioning of the probe mount: detecting probe-probe mount proximity In practice, the probe mount often must be positioned in very close proximity to or even in contact with the probe before the probe pickup actuator 34 in FIG. 2 (e.g. vacuum valve or solenoid plunger) is enabled to avoid unwanted offsets of the probe during the pickup process. A large enough offset during pickup will misalign the probe 4 with respect to the detection system 11. The degree of proximity or contact required will depend on the specific probe and probe pickup device. For this reason it may be desirable to detect when the probe 4 is sufficiently close to or in contact with the probe mount 32 before enabling the probe pickup actuator 34. Many techniques could be used for this including careful control or calibration of the Z-position of the probes, the use of proximity or contact sensors, etc. A variety of proximity sensors are commonly used in industrial devices and work using optical triangulation and other optical techniques, capacitance detection, and detecting changes in pressure for gas blowing through a tube near the target, to name a few.

One additional way to detect contact is already incorporated in the AFM as shown in FIG. 2. It is possible to monitor the vertical and or lateral deflection signals from the beam reflection signal processing electronics as described above. These signals measure the vertical and lateral angle of the cantilever with respect to the incoming laser beam. Due to machining tolerances or design, there will be a slight angle mismatch between the cantilever support substrate 8 on the probe cassette 22 and the probe mount 32 on the scanner 2. When the probe mount 32 makes contact with the cantilever support substrate 8, the angle of the cantilever arm 6 will change as it moves to match the angle of the probe mount. When this occurs, a detectable change in the vertical and lateral deflection signals occurs. Depending on the size of the reflected beam 14 and the position sensitive detector 16, the sum signal may also change, although this is a less sensitive detector of contact between the probe 4 and probe mount 32.

The point of contact between the probe 4 and probe mount 32 therefore can be determined by monitoring any or all of the sum, vertical or lateral deflection signals. When contact between the probe 4 and probe mount 32 is achieved, the probe pickup actuator 34 is enabled, clamping the probe to the probe mount with minimal offset with respect to the detection system.

7. Releasing probes

Once a probe has become dull or contaminated, the system can drop the used probe and pickup a new probe. The system can be operated with no user intervention. To release the used probe, the probe mount 32 is positioned over an empty slot of the probe cassette 22 or over a similar used probe storage area. In some cases, it is only necessary to release the probe pickup actuator 34, for example by turning off the vacuum in the probe mount embodiment shown in FIG. 5 (by closing the vacuum pickup valve 66 and venting the vacuum cavity 60 to the air). The probe can be similarly released in the probe-clamping setup shown in FIG. 6 by positioning the probe mount over a solenoid plunger 74 and engaging the plunger.

In some cases, however, sufficient adhesive force will exist between the probe 4 and the probe mount 32 (usually due to the surface tension of surface contaminants or electrostatic forces) to prevent the probe from dropping off the probe mount when the pickup actuator 34 is disengaged. In this case it is necessary to provide an additional mechanical force to remove the probe from the probe mount.

Figure 9A:
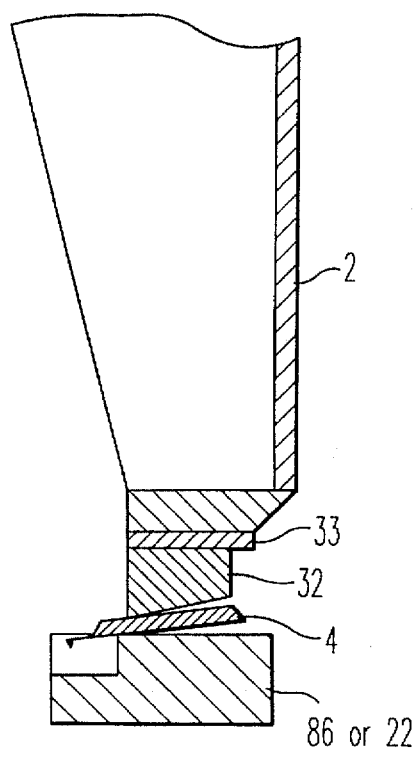
FIGS. 9A–9D are simplified cross-sectional close-up views of several devices illustrating techniques for removing used probes from a scanning probe microscope.
Figure 9B:
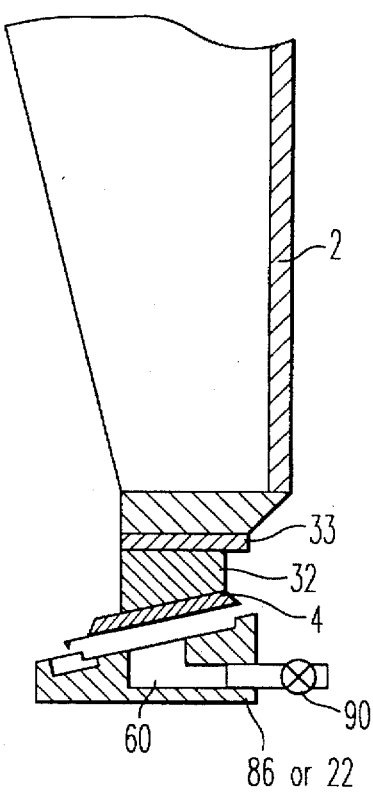
Figure 9C:
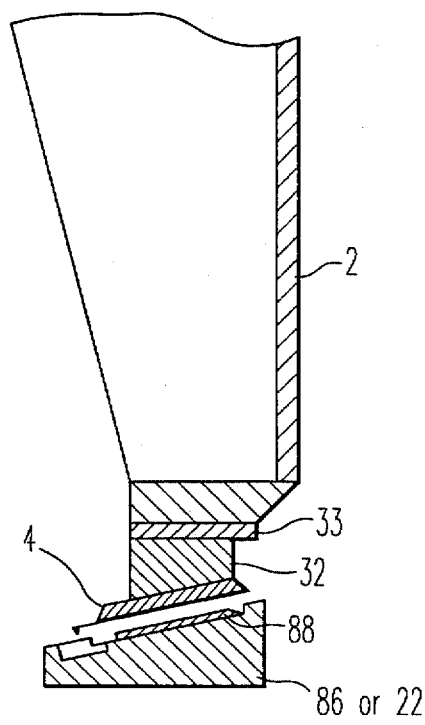
Figure 9D:
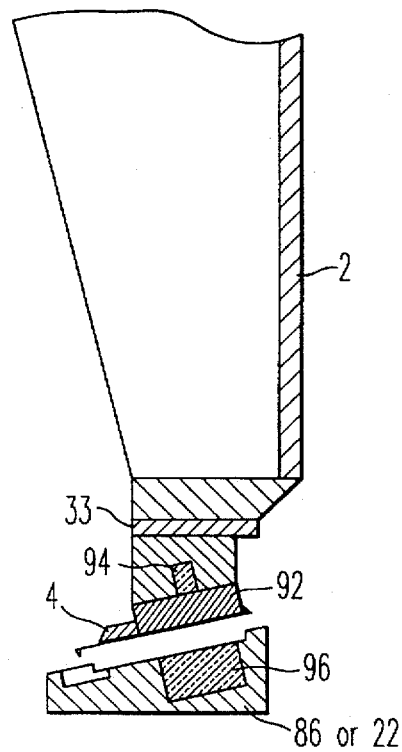

Several methods are shown schematically in FIGS. 9A–9D. One simple technique (FIG. 9A) is to make light mechanical contact between the probe 4 and the probe cassette 22 or alternative surface in a used probe storage area 86. The light contact between probe and another surface will dislodge the probe. The surface of the used probe storage area can also be coated with an adhesive 88 to guarantee that the probe will be pulled from the probe mount upon contact (FIG. 9C).

For an AFM cantilever probe, contact between the probe and the surface of the probe cassette or used probe storage area can be detected in the same manner as described previously-by accurate control or calibration of the component's vertical position, or by monitoring the beam reflection signals. Usually a sharp change in the sum, vertical or lateral deflection signal is noted when the probe 4 drops from the probe mount 32.

Another method (FIG. 9B) involves building an additional vacuum cavity 60 into the probe cassette 22 or into an alternative used probe storage area. In this case, the pickup vacuum valve 66 (FIG. 2) would be turned off as the additional probe removal vacuum valve 90 would be turned on to remove the used probe. Alternatively, a positive air pressure can be directed at the vacuum cavity 60 in the probe mount 32.

Magnetic mounting systems (FIG. 9D) can also be used for example if the probe is mounted to a piece of ferromagnetic material 92. Then a probe pickup magnet 94 holds the probe 4 into the probe mount 32 and a probe removal magnet 96 can be used to remove the used probe. Electromagnets would be preferred for this application because they can be turned on an off. Permanent magnets could also be used provided the probe pickup and release is controlled by another mechanism, for example a mechanical clip that prevents the ferromagnetic probe mount 92 from jumping up to the magnet 94 before proper XYZ alignment is achieved. Many other similar probe pickup and release schemes can also be implemented, including combinations of any of the above ideas.

8. Error Checking

It will often be desirable to check the integrity of the probe mounting and the quality of the probe before using it for an automated measurement. Any of several error checks can be made. For example, in the case of a probe picked up by vacuum (FIG. 5), the vacuum pressure can be checked against a minimum "safety" value. If the vacuum pressure is below the safety value, then the probe 4 has not sealed sufficiently against the probe mount 32, due to some debris or defect on the probe or probe mount, or due to some other system failure. Similar checks can be made for alternative mounting systems. The control system 46 can issue commands to discard the bad probe and then attempt to load a new probe. If repeated failures occur, the control system 46 can alert a technician that probe mounting has failed and that the system requires service.

Several other similar tests can be performed to check for proper probe mounting, alignment, and operation. For the AFM, these can include checking the total amount of light (sum signal) reflected from the cantilever probe, or the final horizontal and vertical deflection signal after probe mounting. A low sum signal may indicate poor alignment with the detection system, while deviations in the horizontal or vertical deflection signal can indicate a warped cantilever 6 or a defective cantilever support substrate 8 or probe mount 32.

For oscillating probe systems, the control system can check the amplitude and/or phase response of the cantilever for a given drive amplitude, the resonant frequency or amplitude spectrum of the cantilever and/or the quality factor "Q" for the oscillating cantilever. By amplitude spectrum, we refer to the amplitude of cantilever oscillation versus oscillation drive frequency. Because oscillating cantilever techniques depend on the transfer of oscillation energy from an oscillating driver 33 though the probe mount to the cantilever, the amplitude response, phase and the quality factor Q test the integrity of the probe and the probe mounting. A well-mounted cantilever probe typically shows a single smooth resonant peak in the amplitude spectrum near the resonant frequency. Unstable mounting of the probe can create multiple peaks in the amplitude spectrum of the cantilever. A low response amplitude can also indicate improper alignment of the detection system 11 to the cantilever 6, because the reflected laser beam 14 will deflect less if the incoming laser beam 14 is positioned some distance away from the free end of the cantilever.

The resonant frequency and full amplitude response spectrum also provide information about the spring constant of the cantilever and can be used to detect defective or damaged cantilevers. Checking the resonant frequency also can detect probe contamination as there is a shift in the resonant frequency due to the added mass of the contaminant.

9. Details of the probe cassette

Next described are details of the probe cassette. FIGS. 4A and 4B show simplified sketches of two of many possible probe cassettes 22. The cassette has space for an arbitrary number of probes, preferably aligned in a line or grid. The sketch shows the specific case of a probe cassette for cantilever probes for atomic force microscopy. The probe cassette has a number of machined or molded probe pockets 78. The pockets are nominally held at the same angle 32 as the probe mount on the end of the scanner 2, to allow easier mating of the probe surface with the probe mount. The pockets may also have additional probe tip clearance 79 to allow the probe to be stored with tips oriented toward the sample, without damaging the probe.

The probe pockets 78 are best formed to have lateral dimensions only slightly larger than the exterior dimensions of the probes, so that stored probes will be closely aligned to a preset pattern. Holding tight tolerances on the stored probe position is not essential, but it speeds up and simplifies the alignment process of the probe mount 32 and detection system 11 (FIG. 2) to the stored probe 4. For the same reason, the probe cassette will typically have precision machined surfaces, kinematic mounting surfaces or other similar high-precision mounting means to ensure that it mounts to the XY translator with high accuracy and reproducibility. FIG. 4B shows, for example, two holes 83 on the lower cantilever cassette that can be mounted on precision pins on the XY translator. It is important to remember that perfect alignment is not necessary—the procedure of moving the XY translator or scanner before picking up the probe will correct for any probe misalignment errors.

The probe cassette may also have several convenient features including fiducial marks, identification marks, particle guards, and a shipping cover. Fiducial marks 80 can be used by an optical system like the objective 36, camera 42 and pattern recognition 44 (shown in FIG. 2) to calibrate the SPM system to the X, Y, and Z positions of the probe cassette 22 and probes 4. Optional identification marks 84 (e.g. bar codes) can indicate for example the number and type of probes loaded into the probe cassette. An optional particle guard 82, consisting of a mechanical barrier or a vacuum ring for example, can prevent particles generated in the probe pickup process from contaminating delicate samples. The probe cassette 22 may also have a protective shipping cover 81 to allow safe transport of stored probes. The protective cover preferably holds the probes 4 into the probe pockets 78 on the probe cassette 22 yet is made from or coated with a material that does not adhere to the probes. This way the cover can be removed without dislodging the probes from their storage location. Alternatively, the probe cassette may have releasable means for holding probes in the cassette, for example, a vacuum holding means previously described and shown in FIG. 9B.

Of course many alternative arrangements are possible. For example, cantilever probes for AFM are often manufactured in wafers consisting of several hundred probes. These entire, unmodified wafers could be used in place of a separate probe cassette. The cantilever probes on the wafers are formed by lithographic processes so they are typically precisely aligned to each other on the sub micron scale. This precise alignment can make the probe exchange process even faster. At the time of probe exchange, the wafer of probes can be automatically loaded onto the XY translation stage by a robotic wafer loader as already used on the Dimension 7000 SPM system manufactured by Digital Instruments. In this case, additional precautions would likely be necessary to limit particle contamination as the probes are broken out of the wafer and installed into the AFM.

10. Other Scanning Probe Microscopes

For the sake of clarity, most of the discussion in this specification has centered on a specific example of an atomic force microscope and a specific detector means, involving the optical lever technique. The principles outlined here can be extended to any of a variety of scanning probe microscopes that require 1) exchanging probes and 2) alignment of the probe to a detection system. For example, an AFM that uses a scanning tunneling microscope (STM) tip and electron tunneling to detect the AFM cantilever motion can be aligned by a similar process of translating the probe mount and detector (STM tip) until appropriate alignment of the STM tip and AFM cantilever is achieved, then picking up the probe. The system can use optical pattern recognition or measurements of electron tunneling or similar technique to detect proper alignment.

Another example is the scanning near field optical microscope (SNOM), where a tapered optical probe transmits light into or receives light from a sample. The optical probes are often vibrated in a direction parallel to the sample and variations in the oscillation amplitude are used to maintain a fixed probe-sample separation. A detection system is then required to measure the motion of the optical probe. Several detection systems have been used including capacitive detection, optical interferometry and other optical techniques. Each of these requires the alignment of some part of the detection system (a capacitor plate or light beam, for example) with a moving part of the optical probe. SNOMs have also recently been built with cantilevered optical probes which also employ optical lever technique to detect motion of the cantilever probe. For these reasons this technique of exchanging and aligning probes can also be used for the SNOM.

There are also many hybrid force microscopes, for example instruments that combine AFM technology with STM imaging, or magnetic imaging or capacitance imaging, or high-speed electrostatic measurements, etc. Any of these or similar techniques may benefit from the probe exchange and alignment technique described here.

Accordingly, as above described, the present invention is directed to a device and method for exchanging and aligning probes for scanning probe microscopes that overcome the limitations of the prior art and provide automatic probe exchange without operator intervention, using translation stages and the scanning mechanism already commonly used in scanning probe microscopes. This is a major step forward in making the technology of scanning probe microscopy accessible to non-experts, including technicians on surface critical fabrication lines, like semiconductor processing or computer hard disk manufacturing.

While the above descriptions contain many specificities, these should not be construed as limitations of the scope of the invention, but rather as examples of one or more preferred embodiment. Many other embodiments are possible. For example, a scanning probe microscope scanner could be mounted on an XYZ translation stage over a fixed sample and fixed probe cassette. It is therefor to be understood that within the scope of the appended claims, the invention may be practiced otherwise than as specifically described herein, and all other mechanical assemblies and processes that produce a similar result or capability should be considered within the scope of the present invention.

What is claimed as new and desired to be secured by letters patent of the United States is:

1. A scanning probe microscope for producing a map of at least one property of a sample at one or more points on said sample, comprising:

probe storage means for storing at least one probe;

a probe mount for supporting said probe stored by said probe storage means when said probe is transferred to said probe mount;

a detection system which detects a probe response related to the at least one property of the sample;

translation means for producing relative translation between the probe mount and the sample and between said probe storage means and the detection system;

selectively activatable probe pickup means for removing a probe from the probe storage means and installing the probe on said probe mount; and control means for controlling the translation means to position the probe storage means in relation to the detection system based at least in part on signals produced by said detection system and then activate the selectively activatable probe pickup means in order to provide automated probe exchange.

2. The scanning probe microscope of claim 1, further comprising:

alignment detection means for measuring the relative alignment of the probe stored in said probe storage means with said detection system.

3. The scanning probe microscope of claim 2, wherein said control means comprises:

means for receiving input from said alignment detection means and outputting control signals applied to said translation means to generate relative motion between said stored probe and said detection system until desired alignment between said stored probe and said detection system is achieved, and means for then activating the selectively activatable probe pickup means.

4. The scanning probe microscope of claim 3, wherein said translation means comprises:

first means for producing relative translation between the probe storage means and the detection system; and second means for producing relative translation between the probe mount and the sample.

5. The scanning probe microscope of claim 4, wherein a combination of motions produced by said first and second means is used to produce alignment between the stored probe and the probe mount.

6. The scanning probe microscope of claim 5, wherein the microscope is an atomic force microscope and said probe is a spring lever or cantilever.

7. The scanning probe microscope of claim 6, wherein said detection system comprises:

optical means for detecting a deflection of said spring lever or cantilever.

8. The scanning probe microscope of claim 3, wherein the alignment detection means comprises:

means for producing an optical image of the stored probe; and pattern recognition means for recognizing a pattern of the produced image.

9. The scanning probe microscope of claim 3, wherein the alignment detection means comprises:

position sensitive detector means for producing at least one of a sum signal, a vertical deflection signal and a lateral deflection signal.

10. The scanning probe microscope of claim 3, wherein said control means comprises:

means for determining when the stored probe and the probe mount are in close proximity or contact prior to alignment of said stored probe so that said stored probe is aligned while in close proximity or in contact with said probe mount; and, means for activating said pickup means to attach the stored probe to the probe mount when the desired alignment of the stored probe is achieved.

11. The scanning probe microscope of claim 10, wherein said means for clamping comprises:

means for applying a vacuum to said stored probe to hold the stored probe against the probe mount by means of said vacuum.

12. The scanning probe microscope of claim 10, wherein said means for clamping comprises:

a clamp selected from the group consisting of a vacuum clamp, a mechanical clamp, an electrostatic clamp and an electromagnetic clamp.

13. The scanning probe microscope of claim 1, wherein the microscope is an atomic force microscope and said probe is a spring lever or cantilever.

14. The scanning probe microscope of claim 13, wherein said detection system comprises:

optical means for detecting a deflection of said spring lever or cantilever.

15. The scanning probe microscope of claim 1, wherein said probe storage means comprises:

a probe storage cassette.

16. The scanning probe microscope of claim 1, wherein said probe storage means comprises:

a wafer on which plural probes are held.

17. The scanning probe microscope of claim 1, wherein:

said probe storage means comprises fiducial marks provided on said probe storage means; and said alignment detection means comprises, means for forming an image including the fiducial marks, means for detecting the fiducial marks in the image, and means for inputting to the control means signals indicative of the detected fiducial marks.

18. The scanning probe microscope of claim 1, wherein said probe storage means is mounted on the translation means also used to move the sample with respect to the probe.

19. A method of mounting a probe on a probe mount of a scanning probe microscope which is capable of producing a map of a property of a sample, said microscope including a relative translation system which produces relative translation between the probe mount and the sample, and a probe response detection system for detecting a response of the probe related to the property of the sample, comprising:

storing on a probe storage device a probe for mounting on said probe mount;

detecting alignment of the stored probe in relation to the probe response detection system and producing a detection signal corresponding to the detected alignment;

controlling the relative translation system in response to said detection signal to align the stored probe relative to the probe response detection system based on the alignment detected in said detecting step in order to provide automated probe exchange; and attaching the stored probe to the probe mount when the detection step detects the probe is in a predetermined position.

20. The method of claim 19, further comprising:

controlling relative separation between the stored probe and the probe mount such that the stored probe is in close proximity or contact with the probe mount before aligning the probe to the probe response detection system.

21. The method of claim 20, comprising:

providing fiducial marks on said probe storage device; and said detecting alignment step comprising, forming an image including the fiducial marks, and detecting the fiducial marks in the image; and said controlling step comprising controlling the translation system to align the stored probe based on the detected fiducial marks.

22. The method of claim 20, wherein said attaching step comprises:

applying a vacuum to the aligned stored probe to hold the aligned probe against the probe mount by means of said vacuum.

23. The method of claim 22, further comprising:

measuring the applied vacuum between the probe and the probe mount to determine whether the probe is securely mounted.

24. The method of claim 20, wherein said step of storing a probe comprises:

holding plural of said probes on a surface of a wafer.

25. The method of claim 24, comprising:

providing plural of fiducial marks on a surface of the wafer; and said detecting alignment step comprising, forming an image including the fiducial marks, and detecting the fiducial marks in the image; and said controlling step comprising controlling the translation system to align a selected of the probes based on the detected fiducial marks.

26. The method of claim 25, further comprising:

using the probe response detection system to detect position of the probe; and said controlling step comprising controlling the translation system to translate the probe into position with respect to the detection system based on the position of the probe detected by the probe response detection system.

27. The method of claim 24, further comprising:

using the probe response detection system to detect position of the probe; and said controlling step comprising controlling the translation system to translate the probe into position with respect to the detection system based on the position of the probe detected by the probe response detection system.

28. The method of claim 19, wherein said detecting alignment step comprises:

producing an optical image of the probe; and recognizing a pattern of the produced image.

29. The method of claim 28, wherein said controlling step comprises:

controlling the translation system to align a selected of the probes based on the pattern recognized in said recognizing step.

30. The method of claim 9, further comprising:

using the probe response detection system to detect position of the probe; and said controlling step comprising controlling the translation system to translate the probe into position with respect to the detection system based on the position of the probe detected by the probe response detection system.

31. The method of claim 21, further comprising:

using the probe response detection system to detect position of the probe; and said controlling step comprising controlling the translation system to translate the probe into position with respect to the detection system based on the position of the probe detected by the probe response detection system.

32. The method of claim 19, wherein said detecting alignment step comprises:

using a position sensitive detector to produce at least one of a sum signal, a vertical deflection signal and a lateral deflection signal.

33. The method of claim 19, wherein said attaching step comprises:

applying a vacuum to the aligned stored probe to hold the aligned probe against the probe mount by means of said vacuum.

34. The method of claim 33, further comprising:

measuring the applied vacuum between the probe and the probe mount to determine whether the probe is securely mounted.

35. The method of claim 19, wherein said attaching step comprises:

clamping the probe to the probe mount using at least one of a vacuum clamp, a mechanical clamp, an electrostatic clamp, and an electromagnetic clamp.

36. An scanning probe microscope which produces a map of at least one property of a sample in relation to detection of a probe response at plural locations on a surface of the sample, comprising:

a probe storage unit having a stored probe;

a probe mount on which a probe stored in the probe storage unit is to be mounted;

a probe response detection system;

a relative translation system by which relative translation is produced between the probe storage unit and the probe mount and by which relative translation is produced between the probe mount having a probe mounted thereon and the sample;

a probe alignment detection system;

a probe pickup device;

a controller which controls the relative translation system in response to an alignment detection signal produced by said probe alignment detection system to position the probe storage unit in relation to the probe mount based on an output of the probe alignment detection system and which activates the probe pickup device to transfer the stored probe to the probe mount when the probe alignment detection system detects a predetermined probe alignment in order to provide automated probe exchange.

37. The scanning probe microscope of claim 36, wherein the probe alignment detection system comprises:

an optical imaging device; and a pattern recognition device coupled to the optical imaging device.

38. The scanning probe microscope of claim 37, implemented as an atomic force microscope.

39. The scanning probe microscope of claim 37, wherein said probe alignment detection system comprises said probe response detection system.

40. The scanning probe microscope of claim 39, wherein said relative translation system comprises:

a common translation stage by which said relative translation is produced between the probe storage unit and the probe mount and by which said relative translation is produced between the probe mount having a probe mounted thereon and the sample.

41. The scanning probe microscope of claim 40, wherein said relative translation system further comprises:

a scanner which produces relative translation between a probe mounted on said probe mount and said sample under control of said controller to produce said map of said at least one property of said sample.

42. The scanning probe microscope of claim 41, wherein said probe comprises a spring lever or cantilever.

43. The scanning probe microscope of claim 42, wherein said probe response detection system comprises:

an optical deflection detector.

44. The scanning probe microscope of claim 41, wherein said probe alignment detector comprises said probe response detection system.

45. The scanning probe microscope of claim 41, wherein said pickup device comprises:

a selectively activatable vacuum source.

46. The scanning probe microscope of claim 41, wherein said pickup device comprises:

a clamp selected from the group consisting of a vacuum clamp, a mechanical clamp, an electrostatic clamp and an electromagnetic clamp.

47. The scanning probe microscope of claim 41, wherein the scanner produces relative translation between the sample and the probe when controlled to produce said map of said at least ore property of the sample, and the common translation stage produces relative translation between said probe mount and said probe storage unit when controlled to position said probe storage unit in relation to the probe mount.

48. The scanning probe microscope of claim 41, comprising:

said probe mount including a cavity; and said probe pickup device including a vacuum source coupled to said cavity via a solenoid valve.

49. The scanning probe microscope of claim 48, further comprising:

a gas, pressure source coupled to said cavity.

50. The scanning probe microscope of claim 41, implemented as an atomic force microscope.

51. The scanning probe microscope of claim 40, implemented as an atomic force microscope.

52. The scanning probe microscope of claim 39, wherein said relative translation system comprises:

a first translation subsystem, consisting of one or more translation stages which produces relative translation between the probe storage means and the probe mount; and a second translation stage consisting of one or more translation stages which produces relative translation between the probe mount having a probe mounted thereon and the sample.

53. The scanning probe microscope of claim 52, wherein said relative translation system further comprises:

a scanner which produces relative translation between a probe mounted on said probe mount and said sample under control of said controller to produce said map of said at least one property of said sample.

54. The scanning probe microscope of claim 53, implemented as an atomic force microscope.

55. The scanning probe microscope of claim 52, wherein a combination of motions produced by said first and second translation stages produces alignment between the stored probe and the probe response detection system.

56. The scanning probe microscope of claim 52, implemented as an atomic force microscope.

57. The scanning probe microscope of claim 35, implemented as an atomic force microscope.

58. The scanning probe microscope of claim 37, wherein:

said controller outputs control signals to said translation system in response to said probe alignment detector;

said translation system generates relative motion between said probe storage unit and said probe response detection system in response to said control signals so that said stored probe is aligned with said probe response detection system; and said controller activates the probe pickup device when alignment of said stored probe with said probe response detection system is detected by said probe alignment detection system.

59. The scanning probe microscope of claim 58, wherein the probe alignment detection system comprises:

a position sensitive detector which produces at least one of a sum signal, a vertical deflection signal and a lateral deflection signal.

60. The scanning probe microscope of claim 58, comprising:

a probe/probe mount proximity detector; and said controller outputting said control signals in response to said probe/probe mount proximity detector, and activating the probe pickup device when the probe is in contact or in close proximity to the probe mount.

61. The scanning probe microscope of claim 60, comprising:

said probe mount including a cavity; and said probe pickup device including a vacuum source coupled to said cavity via a solenoid valve.

62. The scanning probe microscope of claim 61, further comprising:

gas pressure source coupled to said cavity.

63. The scanning probe microscope of claim 60, implemented as an atomic force microscope.

64. The scanning probe microscope of claim 58, implemented as an atomic force microscope.

65. The scanning probe microscope of claim 36, wherein said probe comprises a spring lever or cantilever.

66. The scanning probe microscope of claim 65, wherein said probe response detection system comprises:

an optical deflection detector.

67. The scanning probe microscope of claim 36 wherein said pickup device comprises:

a selectively activatable vacuum source.

68. The scanning probe microscope of claim 36, wherein said pickup device comprises:

a clamp selected from the group consisting of a vacuum clamp, a mechanical clamp, an electrostatic clamp and an electromagnetic clamp.

69. The scanning probe microscope of claim 36, wherein said probe storage unit comprises:

a probe storage cassette.

70. The scanning probe microscope of claim 36, wherein said probe storage unit comprises:

a wafer on which plural probes are held.

71. The scanning probe microscope of claim 36, wherein:

said probe storage unit comprises fiducial marks; and said probe alignment detection system comprises a probe storage unit optical imaging device and a fiducial mark pattern recognition detector coupled to said probe storage unit optical imaging device and to the controller.

72. The scanning probe microscope of claim 36, comprising:

said probe mount including a cavity; and said probe pickup device including a vacuum source coupled to said cavity via a solenoid valve.

73. The scanning probe microscope of claim 60, further comprising:

a gas pressure source coupled to said cavity.

74. The scanning probe microscope of claim 73, implemented as an atomic force microscope.

75. The scanning probe microscope of claim 36, implemented as an atomic force microscope.

\* \* \* \* \*